(12) United States Patent
Chen et al.

(10) Patent No.: US 12,199,555 B2
(45) Date of Patent: Jan. 14, 2025

(54) SYNCHRONOUS DRIVING DEVICE AND PHOTOVOLTAIC TRACKING BRACKET SYSTEM FOR PHOTOVOLTAIC TRACKING LINKAGE ROTATION

(71) Applicant: ARCTECH SOLAR HOLDING CO., LTD., Kunshan (CN)

(72) Inventors: Jingqiang Chen, Kunshan (CN); Ying Yang, Kunshan (CN)

(73) Assignee: ARCTECH SOLAR HOLDING CO., LTD., Kunshan (CN)

( * ) Notice: Subject to any disclaimer, the term of this patent is extended or adjusted under 35 U.S.C. 154(b) by 0 days.

(21) Appl. No.: 18/273,761

(22) PCT Filed: Aug. 26, 2022

(86) PCT No.: PCT/CN2022/114967
§ 371 (c)(1),
(2) Date: Jul. 21, 2023

(87) PCT Pub. No.: WO2023/221323
PCT Pub. Date: Nov. 23, 2023

(65) Prior Publication Data
US 2024/0266991 A1    Aug. 8, 2024

(30) Foreign Application Priority Data
May 20, 2022   (CN) .......................... 202221230315.1

(51) Int. Cl.
*H02S 20/32*   (2014.01)
*F16H 1/22*    (2006.01)
(Continued)

(52) U.S. Cl.
CPC .............. *H02S 20/32* (2014.12); *F16H 1/225* (2013.01); *F16H 2057/02039* (2013.01);
(Continued)

(58) Field of Classification Search
CPC ........ H02S 20/32; F16H 1/225; F16H 57/025; F16H 57/039; F16H 2057/02039;
(Continued)

(56) References Cited

U.S. PATENT DOCUMENTS

| 2008/0308091 | A1 | 12/2008 | Corio | |
| 2014/0338659 | A1* | 11/2014 | Corio | F24S 30/428 126/714 |
| 2021/0328542 | A1* | 10/2021 | Wang | F16H 57/039 |

FOREIGN PATENT DOCUMENTS

| AU | 2019101741 A1 | 8/2020 |
| BR | 212020024974-8 U2 | 11/2021 |

(Continued)

Primary Examiner — Michael Y Sun
(74) Attorney, Agent, or Firm — Cheng-Ju Chiang

(57) ABSTRACT

A synchronous driving device includes a driving source and a driving drive mechanism. The driving drive mechanism includes a first housing and a driving transmission assembly arranged in the first housing and engaged in transmission. The driving transmission assembly includes an input shaft, a first output shaft, a second output shaft, a third output shaft and a fourth output shaft. A driving end of the driving source is connected with the input shaft. Both the third output shaft and the fourth output shaft are perpendicular to the first output shaft and the second output shaft. The first output shaft, the second output shaft, the third output shaft and the fourth output shaft are configured to be driven by the driving source to rotate synchronously. A photovoltaic tracking bracket system having the synchronous driving device is also disclosed.

4 Claims, 13 Drawing Sheets

(51) Int. Cl.
*F16H 57/02* (2012.01)
*F16H 57/025* (2012.01)
*F16H 57/039* (2012.01)
*F24S 25/65* (2018.01)
*F24S 30/425* (2018.01)
*F24S 30/428* (2018.01)
*F24S 30/452* (2018.01)
*H02K 7/116* (2006.01)

(52) U.S. Cl.
CPC .......... *F16H 57/025* (2013.01); *F16H 57/039* (2013.01); *F24S 25/65* (2018.05); *F24S 30/425* (2018.05); *F24S 30/428* (2018.05); *F24S 30/452* (2018.05); *H02K 7/1166* (2013.01)

(58) Field of Classification Search
CPC . F16H 1/22; F24S 25/65; F24S 30/425; F24S 30/428; F24S 30/452; H02K 7/1166; Y02E 10/50
See application file for complete search history.

(56) References Cited

FOREIGN PATENT DOCUMENTS

| | | |
|---|---|---|
| BR | 112015028404-3 B1 | 12/2021 |
| CA | 2917882 A1 | 11/2014 |
| CN | 205725606 U | 11/2016 |
| CN | 206506480 U | 9/2017 |
| CN | 210111921 U | 2/2020 |
| CN | 210469209 U | 5/2020 |
| CN | 210770049 U | 6/2020 |
| CN | 210895132 U | 6/2020 |
| CN | 211015152 U | 7/2020 |
| CN | 211296653 U | 8/2020 |
| CN | 112436793 A | 3/2021 |
| CN | 213069594 U | 4/2021 |
| CN | 213069595 U | 4/2021 |
| CN | 213929313 U | 8/2021 |
| CN | 214069867 U | 8/2021 |
| CN | 214311457 U | 9/2021 |
| CN | 214946114 U | 11/2021 |
| CN | 214946115 U | 11/2021 |
| CN | 215222095 | * 12/2021 |
| CN | 215222095 U | 12/2021 |
| CN | 216751627 U | 6/2022 |
| CN | 217736234 U | 11/2022 |
| EP | 2997316 B1 | 5/2019 |
| EP | 3961915 A1 | 3/2022 |
| ES | 2735546 T3 | 12/2019 |
| ES | 1257967 U | 12/2020 |
| ES | 1271451 U | 6/2021 |
| JP | 2008-95748 A | 4/2008 |
| MX | 2015015696 A | 7/2016 |
| SA | 515370142 B1 | 11/2019 |
| WO | 2014/186079 A2 | 11/2014 |
| WO | 2014/186079 A3 | 11/2014 |

* cited by examiner

SYNCHRONOUS DRIVING DEVICE AND PHOTOVOLTAIC TRACKING BRACKET SYSTEM FOR PHOTOVOLTAIC TRACKING LINKAGE ROTATION

CROSS-REFERENCE TO RELATED APPLICATION

This patent application is a 35 U.S.C. § 371 National Phase conversion of International (PCT) Patent Application No. PCT/CN2022/114967, filed on Aug. 26, 2022, which claims priority of a Chinese Patent Application No. 202221230315.1, filed on May 20, 2022 and titled "SYNCHRONOUS DRIVING DEVICE AND PHOTOVOLTAIC TRACKING BRACKET SYSTEM", the entire content of which is incorporated herein by reference. The PCT International Patent Application was filed in Chinese.

TECHNICAL FIELD

The present disclosure relates to a synchronous driving device and a photovoltaic tracking bracket system, which belongs to the field of photovoltaic brackets.

BACKGROUND

At present, most of the multi-point driving systems of photovoltaic tracking brackets are flat single-axis structures, and the photovoltaic tracking brackets with flat single-axis structures are non-linkage systems. In order to control the cost, the single-axis system is bound to be relatively long, with too many single-axis components. This leads to a decline in system stability and requires higher land leveling. Therefore, it is necessary to provide a synchronous driving device and a photovoltaic tracking bracket system to solve the above problems.

SUMMARY

An object of the present disclosure is to provide a synchronous driving device and a photovoltaic tracking bracket system, which is configured for photovoltaic tracking linkage rotation.

In order to achieve the above object, the present disclosure adopts the following technical solutions:
a synchronous driving device, including:
a driving source;
a driving drive mechanism including a first housing and a driving transmission assembly which is arranged in the first housing and engaged in transmission; the driving transmission assembly including an input shaft, a first output shaft, a second output shaft, a third output shaft and a fourth output shaft; a driving end of the driving source being connected with the input shaft; the first output shaft, the second output shaft, the third output shaft and the fourth output shaft protruding beyond the first housing, respectively; the first output shaft and the second output shaft being disposed in parallel along a vertical direction; the third output shaft and the fourth output shaft protruding oppositely beyond the first housing; both the third output shaft and the fourth output shaft being perpendicular to the first output shaft and the second output shaft; the first output shaft, the second output shaft, the third output shaft and the fourth output shaft being configured to be driven by the driving source to rotate synchronously.

Further, the driving transmission assembly further includes a driving worm gear, a driving worm meshing with a lower side of the driving worm gear, a first driving gear arranged coaxially with the driving worm, a second driving gear meshing with a lower side of the first driving gear, a third driving gear arranged coaxially with the second driving gear, and a fourth driving gear meshing perpendicularly with the third driving gear.

Further, the driving worm includes a first connecting portion and a second connecting portion; the first connecting portion and the second connecting portion are respectively arranged at two free ends of the driving worm opposite to each other; the first connecting portion is the third output shaft; and the second connecting portion is the fourth output shaft.

Further, a third connecting portion is provided at an end of the second driving gear and a fourth connecting portion is provide at an end of the third driving gear; the third connecting portion and the fourth connecting portion are respectively arranged at opposite ends of the second driving gear and the third driving gear; the third connecting portion is the third output shaft; and the fourth connecting portion is the fourth output shaft.

Further, the fourth driving gear includes a fifth connecting portion and a sixth connecting portion; the fifth connecting portion and the sixth connecting portion are respectively arranged at two free ends of the fourth driving gear opposite to each other; the fifth connecting portion is the input shaft; the fifth connecting portion is connected with the driving source; and the sixth connecting portion is the second output shaft.

Further, the driving worm gear includes two seventh connecting portions; the two seventh connecting portions are respectively arranged at two ends of the driving worm gear; and the two seventh connecting portions are the first output shaft.

In order to achieve the above object, the present disclosure adopts the following technical solutions:
a photovoltaic tracking bracket system, including:
a driving tracking bracket system including a first main shaft, a first driven drive mechanism and a synchronous driving device according to the above; the synchronous driving device and the first driven drive mechanism being disposed at intervals along a length direction of the first main shaft; a structure of the first driven drive mechanism being the same as that of the driving drive mechanism; the first driven drive mechanism being connected with the driving drive mechanism through a synchronization shaft;
at least one first driven tracking bracket system which is arranged on one side along a width direction of the first main shaft; the at least one first driven tracking bracket system including a second main shaft, a second driven drive mechanism and a third driven drive mechanism; the second main shaft being arranged parallel to the first main shaft; the second driven drive mechanism and the third driven drive mechanism being disposed at intervals along a length direction of the second main shaft; the second driven drive mechanism and the third driven drive mechanism having the same structure as the driving drive mechanism; the driving drive mechanism being connected with the second driven drive mechanism through a first linkage rod; the first driven drive mechanism being connected with the third driven drive mechanism through another first linkage rod;
at least one second driven tracking bracket system which is arranged on another side along the width direction of the first main shaft; the at least one second driven tracking bracket system including a third main shaft, a fourth driven drive mechanism and a fifth driven drive mechanism; the third main shaft being arranged parallel to the first main shaft; the fourth driven drive mechanism and the fifth driven drive mechanism being disposed at intervals along a length direction of the third main shaft; the fourth driven drive mechanism and the fifth driven drive mechanism having the same structure as the driving drive mechanism; the driving drive mechanism being connected with the fourth driven drive mechanism through a second linkage rod; and the first driven drive mechanism being connected with the fifth driven drive mechanism through another second linkage rod.

Further, when at least two first driven tracking bracket systems are provided, the at least two first driven tracking bracket systems are disposed at intervals; two second driven drive mechanisms of adjacent first driven tracking bracket systems are connected through the first linkage rod; two third driven drive mechanisms of the adjacent first driven tracking bracket systems are connected through the another first linkage rod; and/or, when at least two second driven tracking bracket systems are provided, the at least two second driven tracking bracket systems are disposed at intervals; two fourth driven drive mechanisms of adjacent second driven tracking bracket systems are connected through the second linkage rod; two fifth driven drive mechanisms of the adjacent fourth driven tracking bracket systems are connected through the another second linkage rod.

Further, each of two ends of the first linkage rod is provided with a universal joint; and each of two ends of the second linkage rod is provided with a universal joint.

Further, a sum of lengths of the two first linkage rods is smaller than a length of the synchronization shaft; a sum of lengths of the two second linkage rods is less than the length of the synchronization shaft.

Compared with the prior art, the beneficial effects of the present disclosure are as follows.

In summary, the synchronous driving device of the present disclosure sets the driving drive mechanism with the first output shaft, the second output shaft, the third output shaft and the fourth output shaft which are respectively used to connect the main shaft, the synchronization shaft, the first driven tracking bracket system and the second driven tracking bracket system linked to adjacent sides, compared with the structure using the push rod arm and the connecting rod, the material used and the cost of the present disclosure can be reduced, and the whole structure can be made more compact;

In addition, the photovoltaic tracking bracket system of the present disclosure is provided with the above-mentioned synchronous driving device and the first driven drive mechanism at intervals on the first main shaft of the driving tracking bracket system. The third output shaft and the fourth output shaft of the synchronous driving device are respectively used for linkage connection with the adjacent first driven tracking bracket system and the second driven tracking bracket system to realize multi-point synchronous driving of the driven tracking bracket system. The precision and stability of the main shaft rotation are improved, and the torque of the main shaft is reduced. Compared with the flat single-axis tracking bracket system, the linked photovoltaic tracking bracket system of the present disclosure can also save a control box of the driven tracking bracket, which reduces the cost. Two shorter linkage rod transmission structures replace a longer synchronization shaft, which also saves material.

DETAILED DESCRIPTION

Figure 1:
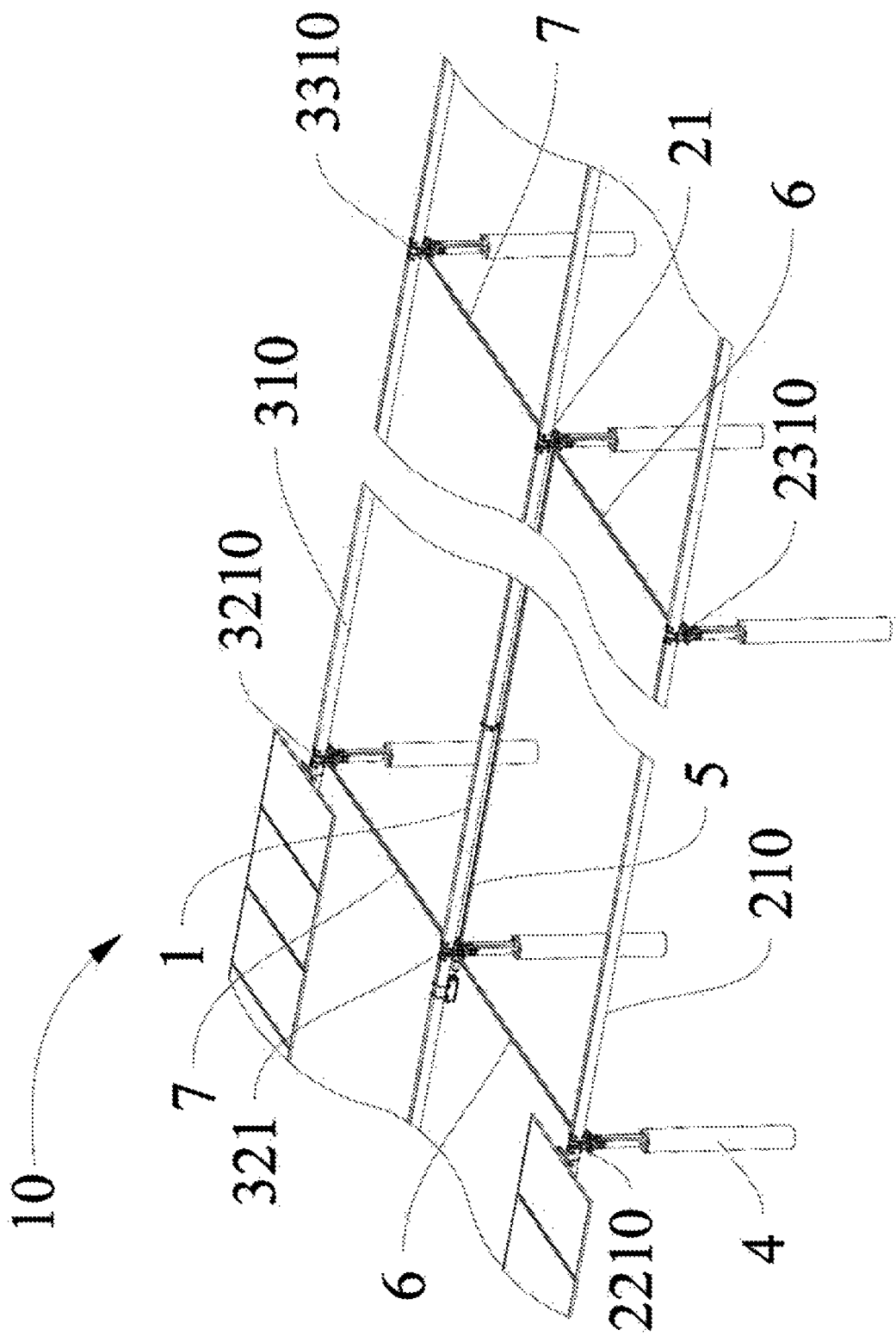
FIG. 1 is a perspective schematic view of a photovoltaic tracking bracket system of the present disclosure.

Embodiments of the present disclosure are described in detail below, and examples of the embodiments are shown in drawings. The embodiments described below with reference to the drawings are exemplary, and are intended to explain the present disclosure, but should not be understood as a limitation to the present disclosure. The exemplary embodiments will be described in detail here, and examples thereof are shown in the drawings. When the following description refers to the drawings, unless otherwise indicated, the same numbers in different drawings indicate the same or similar elements. The implementation embodiments described in the following exemplary embodiments do not represent all implementation embodiments consistent with the present disclosure. On the contrary, they are merely examples of devices and methods consistent with some aspects of the present disclosure as detailed in the appended claims.

The terms used in the present disclosure are only for the purpose of describing specific embodiments, and are not intended to limit the protection scope of the present disclosure. As used in the specification and claims of the present disclosure, the singular forms "a," "the," or "said" are intended to include the plural forms as well, unless the context clearly dictates otherwise.

It should be understood that words such as "first", "second" and similar words used in the specification and claims of the present disclosure do not indicate any order, quantity or importance, but are only used to distinguish the naming of features. Likewise, "a" or "an" and the like do not denote a quantitative limitation, but rather denote the presence of at least one. Unless otherwise specified, words such as "front", "rear", "top", "bottom" and other similar words appearing in this application are only for the convenience of description, and are not limited to a specific position or a spatial orientation. Words such as "including", "comprising" and the like are an open-ended formulation, meaning that elements appearing before "including" or "comprising" encompass elements appearing after "including" or "comprising" and their equivalents. This does not exclude that elements appearing before "including" or "comprising" can also include other elements. In this disclosure, if "a plurality of" appears, it means two or more.

Referring to FIG. 1 to FIG. 13, the present disclosure discloses a photovoltaic tracking bracket system 10 which includes a driving tracking bracket system 100, at least one first driven tracking bracket system 200, and at least one second driven tracking bracket system 300. The at least one first driven tracking bracket system 200 is arranged on one side along a width direction of the driving tracking bracket system 100, and the at least one second driven tracking bracket system 300 is arranged on another side of the driving tracking bracket system 100 in the width direction. The driving tracking bracket system 100 drives the at least one first driven tracking bracket system 200 and the at least one second driven tracking bracket system 300 to rotate synchronously. Different from the single-row multi-point photovoltaic tracking bracket system, the photovoltaic tracking bracket system 10 in the present embodiment greatly improves the stability of the entire system, reduces structural materials, and reduces material costs. At the same time, it can also reduce the number of control boxes and reduce electricity costs. Moreover, the requirements for land leveling are relatively low, so that the photovoltaic tracking bracket system 10 in this embodiment has a stronger ability to adapt to the terrain, thereby increasing the return on investment.

Figure 2:
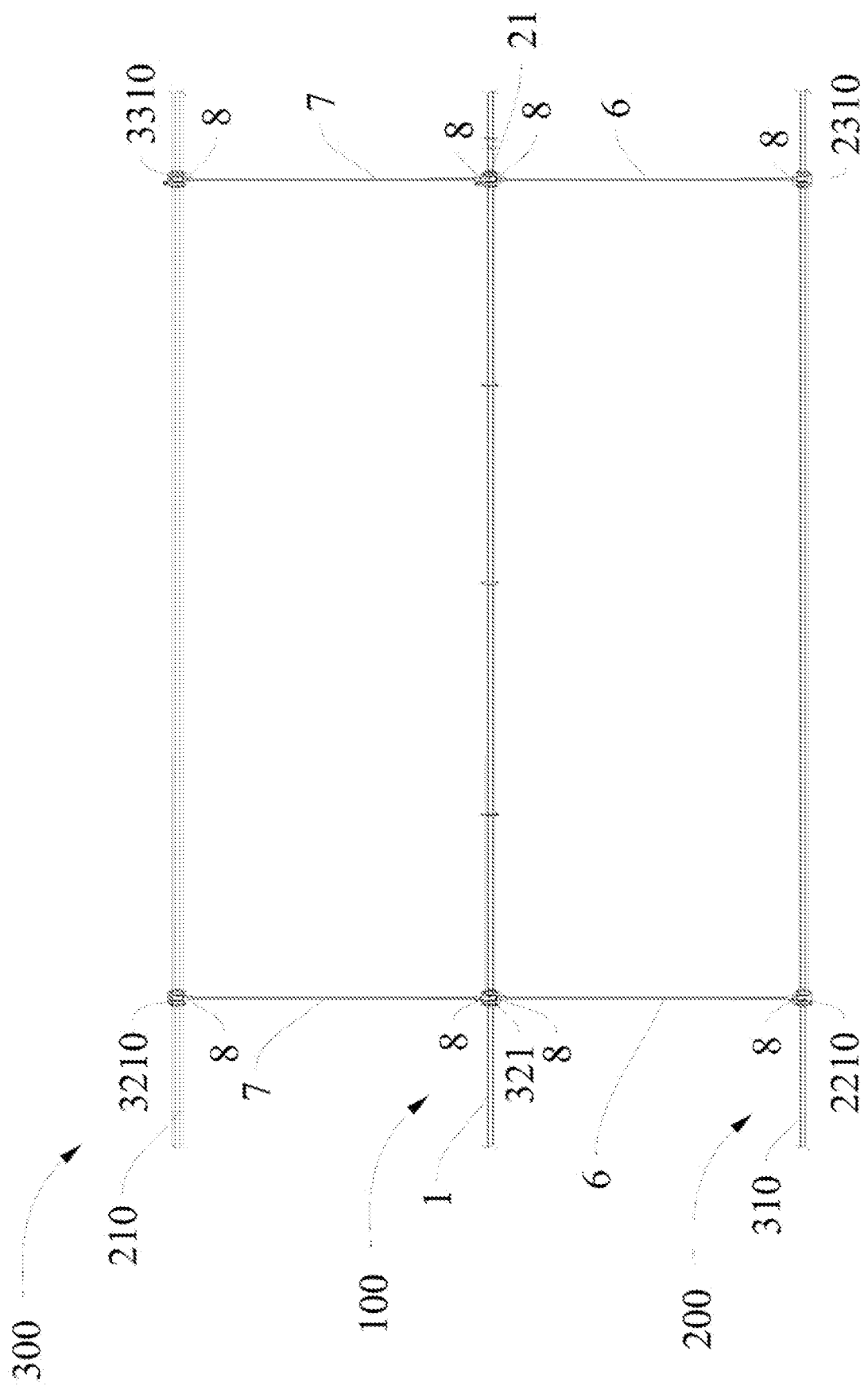
FIG. 2 is a top view of FIG. 1.

Referring to FIG. 1 and FIG. 2, the driving tracking bracket system 100 includes a first main shaft 1, a first driven drive mechanism 2 and a synchronous driving device 3. The synchronous driving device 3 and the first driven drive mechanism 2 are disposed at intervals along a length direction of the first main shaft 1. The driving tracking bracket system 100 also includes a plurality of columns 4. The first main shaft 1, the first driven drive mechanism 2 and the synchronous driving device 3 are arranged on the tops of the columns 4. The first main shaft 1 is rotatable around its own axis so as to drive the photovoltaic module installed on the first main shaft 1 to rotate. The synchronous driving device 3 is installed on the top of the column 4 and is used to drive the first main shaft 1 to rotate.

Figure 3:
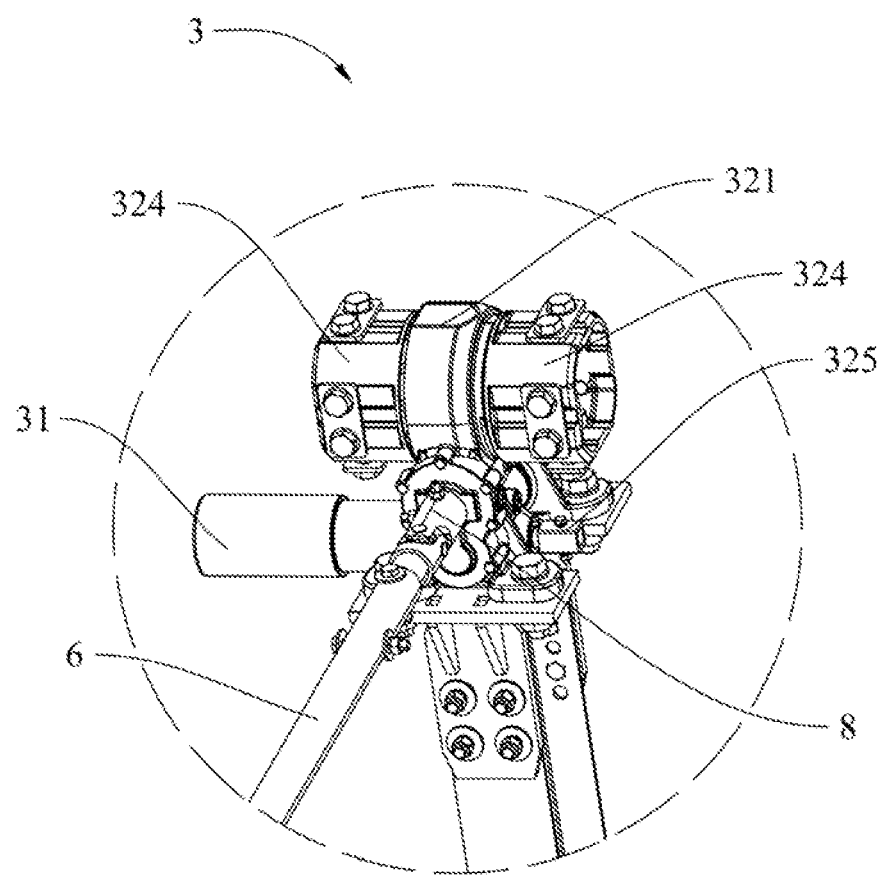
FIG. 3 is a partially enlarged schematic view of a synchronous driving device, a first linkage rod and a second linkage rod of the present disclosure.
Figure 4:
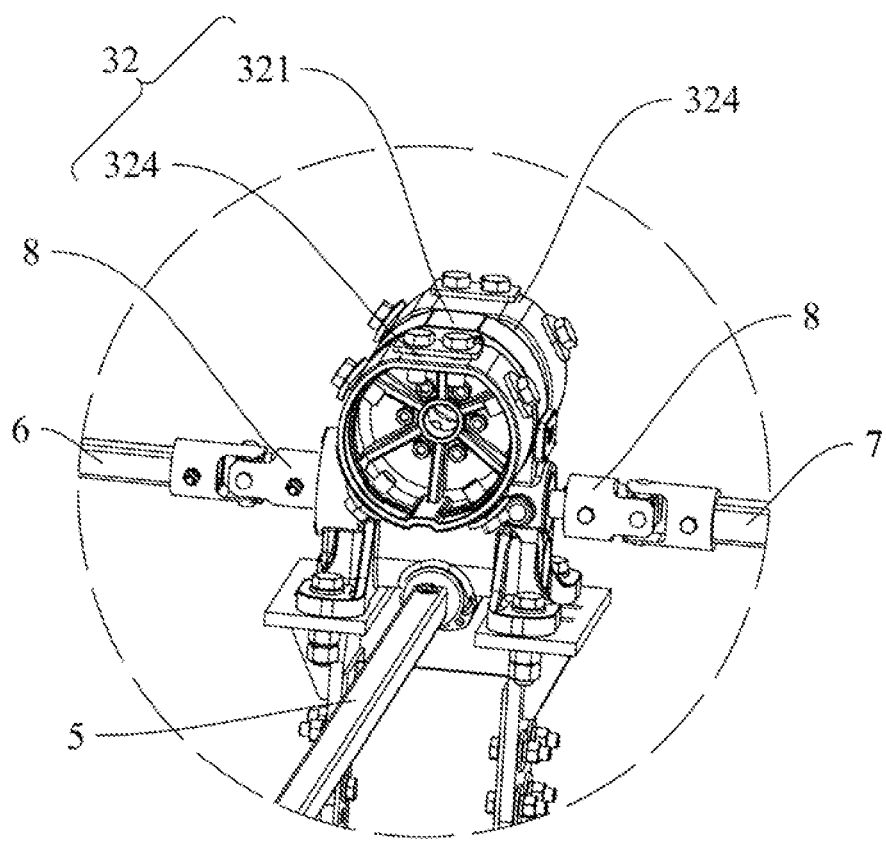
FIG. 4 is a partially enlarged schematic view of FIG. 3 from another angle.
Figure 5:
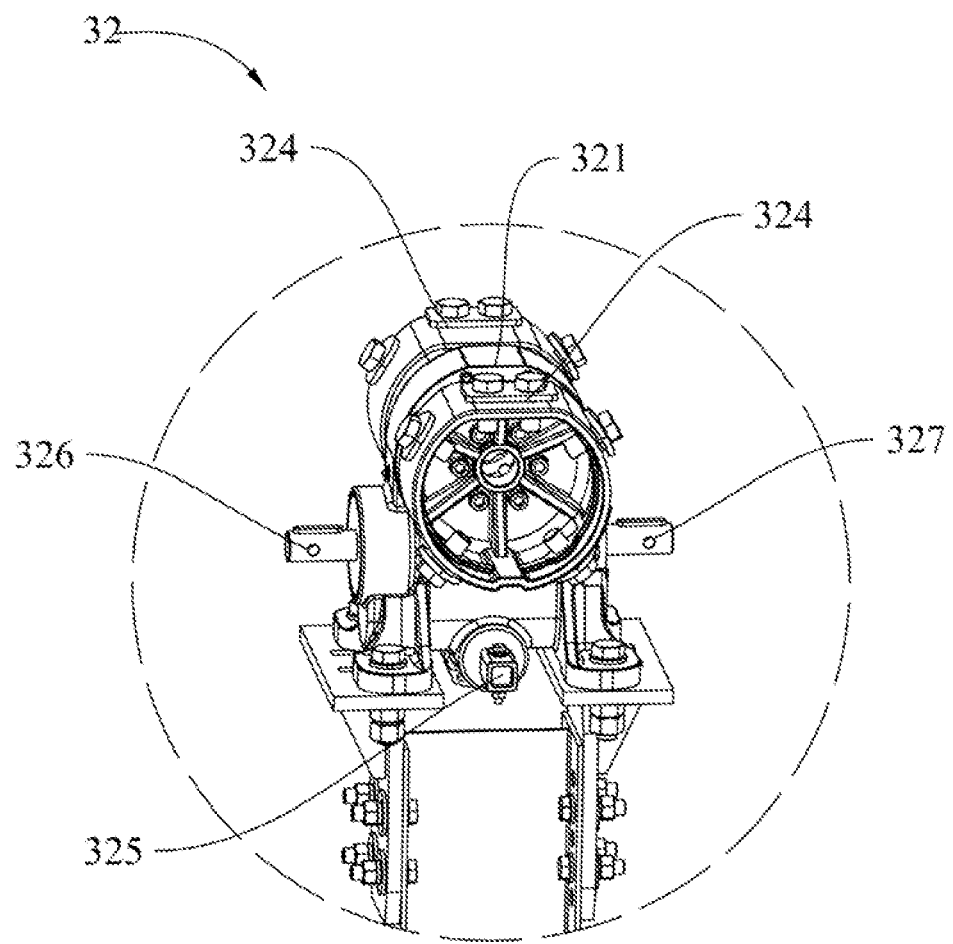
FIG. 5 is a partially enlarged schematic view of a driving drive mechanism of the present disclosure.
Figure 6:
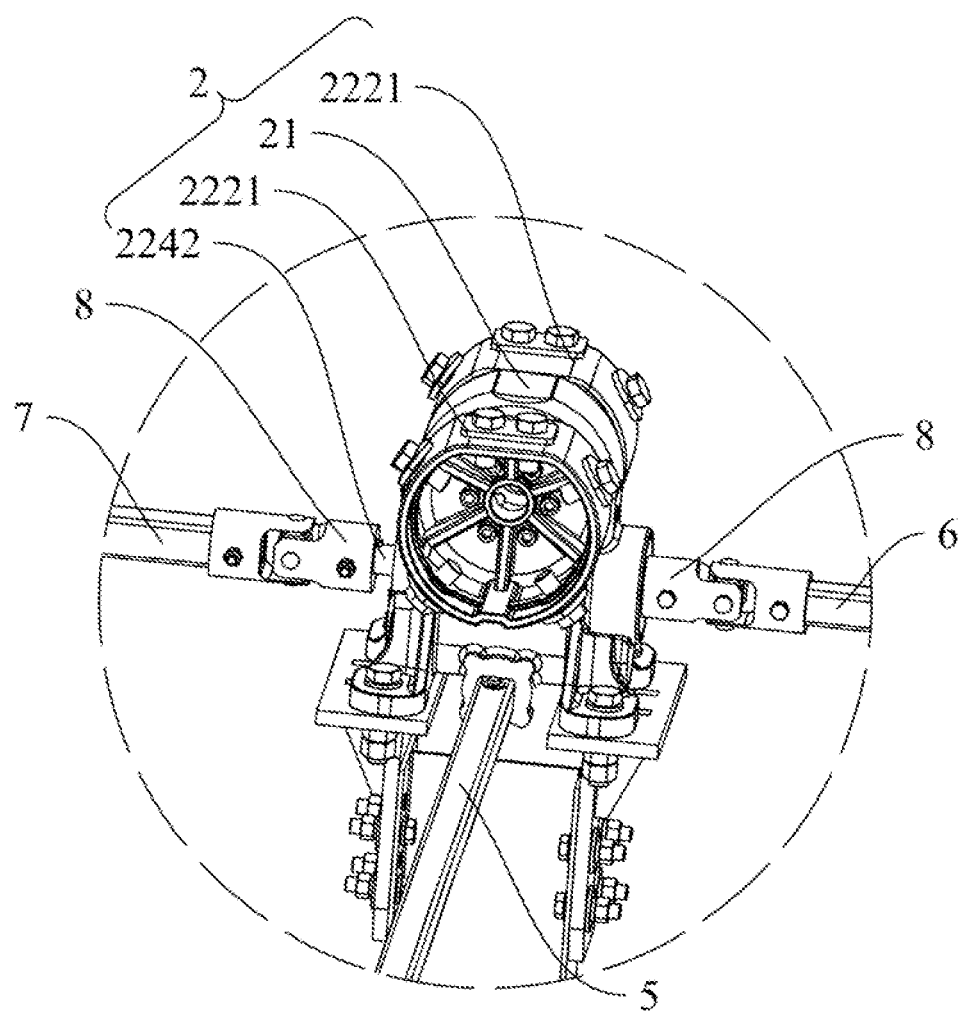
FIG. 6 is a partially enlarged schematic view of a first driven drive mechanism, the first linkage rod and the second linkage rod of the present disclosure.
Figure 7:
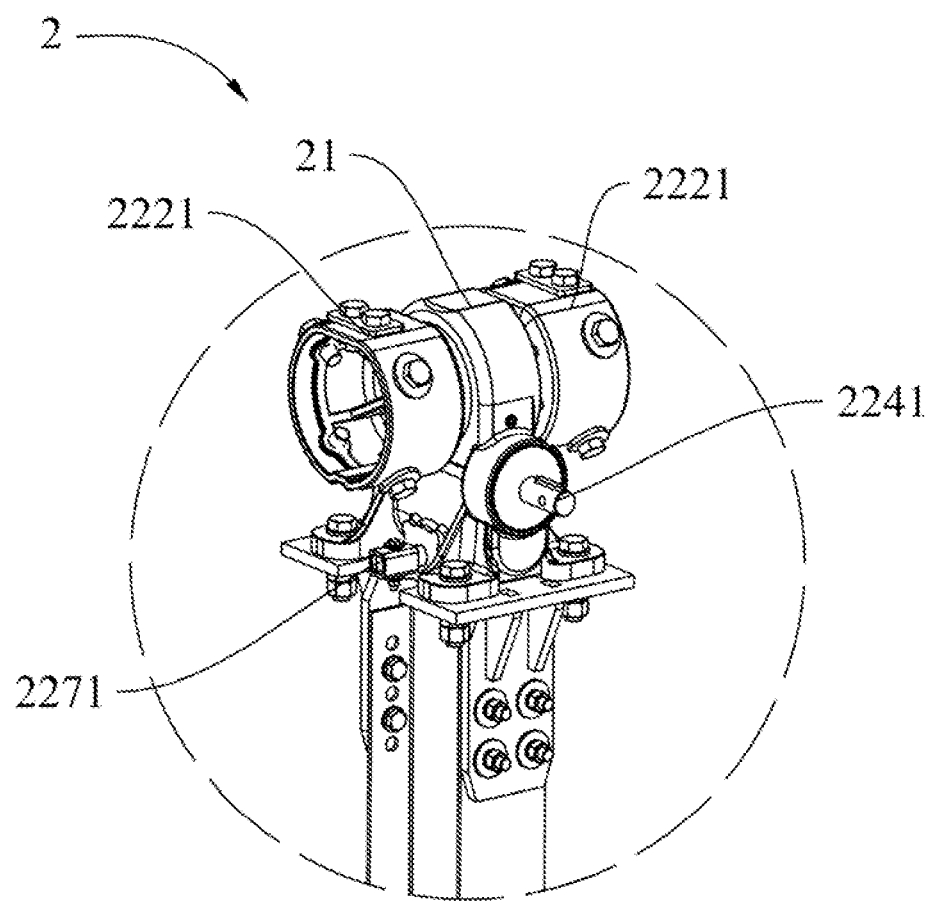
FIG. 7 is a partially enlarged schematic view of a first driven drive mechanism of the present disclosure.

Referring to FIG. 3 to FIG. 5, the synchronous driving device 3 includes a driving source 31 and a driving drive mechanism 32. The driving drive mechanism 32 includes a first housing 321 and a driving transmission assembly 322 which is arranged in the first housing 321 and engaged in transmission. The driving transmission assembly 322 includes an input shaft, a first output shaft 324, a second output shaft 325, a third output shaft 326 and a fourth output shaft 327. A driving end of the driving source 31 is connected with the input shaft. The first output shaft 324, the second output shaft 325, the third output shaft 326 and the fourth output shaft 327 protrude beyond the first housing 321, respectively. The first output shaft 324 is disposed parallel to the second output shaft 325 along a vertical direction. The third output shaft 326 and the fourth output shaft 327 protrude beyond the first housing 321 oppositely. The third output shaft 326 and the fourth output shaft 327 are both perpendicular to the first output shaft 324 and the second output shaft 325. Driven by the driving source 31, the first output shaft 324, the second output shaft 325, the third output shaft 326 and the fourth output shaft 327 can rotate synchronously.

Referring to FIG. 2 to FIG. 5 and FIG. 12, the driving transmission assembly 322 further includes a driving worm gear 3221, a driving worm 3222 meshing with a lower side of the driving worm gear 3221, a first driving gear 3223 arranged coaxially with the driving worm 3222, a second driving gear 3224 meshing with a lower side of the first driving gear 3223, a third driving gear 3225 arranged coaxially with the second driving gear 3224, and a fourth driving gear 3226 perpendicularly meshed with the third driving gear 3225. A shaft axis of a shaft where the driving worm 3222 and the first driving gear 3223 are located is parallel to a shaft axis of a shaft where the second driving gear 3224 and the third driving gear 3225 are located. A rotation axis of the fourth driving gear 3226 is perpendicular to the shaft axis of the shaft where the second driving gear 3224 and the third driving gear 3225 are located, and is parallel to a rotation axis of the driving worm gear 3221. The driving worm gear 3221 is connected with the first main shaft 1.

In this embodiment, the driving worm 3222 includes a first connecting portion and a second connecting portion. The first connecting portion and the second connecting portion are disposed on two opposite free ends of the driving worm 3222, respectively. The first connecting portion is the third output shaft 326. The second connecting portion is the fourth output shaft 327.

In other embodiments, the third output shaft 326 and the fourth output shaft 327 can also be disposed on the second driving gear 3224 and the third driving gear 3225. Specifically, an end of the second driving gear 3224 is provided with a third connecting portion, and an end of the third driving gear 3225 is provided with a fourth connecting portion. The third connecting portion and the fourth connecting portion are disposed at opposite ends of the second driving gear 3224 and the third driving gear 3225, respectively. The third connecting portion is the third output shaft 326. The fourth connecting portion is the fourth output shaft 327.

The driving worm gear 3221 includes two seventh connecting portions. The two seventh connecting portions are disposed at two ends of the driving worm gear 3221, respectively. The two seventh connecting portions are the first output shaft 324.

The fourth driving gear 3226 includes a fifth connecting portion and a sixth connecting portion. The fifth connecting portion and the sixth connecting portion are disposed on opposite free ends of the fourth driving gear 3226, respectively. The fifth connecting portion is the input shaft. The fifth connecting portion is connected with the driving source 31. The sixth connecting portion is the second output shaft 325. The driving source 31 drives the input shaft to rotate, thereby driving the fourth driving gear 3226 to rotate, and sequentially transmits the power to the third driving gear 3225, the second driving gear 3224, the first driving gear 3223, the driving worm 3222 and the driving worm gear 3221, so that the fourth driving gear 3226, the third driving gear 3225, the second driving gear 3224, the first driving gear 3223, the driving worm 3222 and the driving worm gear 3221 rotate synchronously. That is, the first output shaft 324, the second output shaft 325, the third output shaft 326 and the fourth output shaft 327 can simultaneously transmit power outward.

Referring to FIG. 1 to FIG. 2, FIG. 6 to FIG. 7, and FIG. 13, a structure of the first driven drive mechanism 2 is the same as that of the driving drive mechanism 32. The driving drive mechanism 32 and the first driven drive mechanism 2 are respectively arranged at different axial positions of the first main shaft 1. The first driven drive mechanism 2 includes a second housing 21 and a first transmission assembly 22 disposed in the second housing 21. The first transmission assembly 22 includes a first driven worm gear 222, a first driven worm 223 meshing with a lower side of the first driven worm gear 222, a first driven gear 224 arranged coaxially with the first driven worm 223, a second driven gear 225 meshing with a lower side of the first driven gear 224, a third driven gear 226 arranged coaxially with the second driven gear 225, and a fourth driven gear 227 meshing perpendicularly with the third driven gear 226. A shaft axis of a shaft where the first driven worm 223 and the first driven gear 224 are located is parallel to a shaft axis of a shaft where the second driven gear 225 and the third driven gear 226 are located. A rotation axis of the fourth driven gear 227 is perpendicular to the shaft axis of the shaft where the second driven gear 225 and the third driven gear 226 are located, and parallel to a rotation axis of the first driven worm gear 222. The first driven worm gear 222 is connected with the first main shaft 1. Two first power output shafts 2221 are provided at two ends of the first driven worm gear 222. The first power output shaft 2221 is connected to the first main shaft 1. An end of the fourth driven gear 227 is provided with a first power input shaft 2271. The first driven drive mechanism 2 is connected to the driving drive mechanism 32 through a synchronization shaft 5. One end of the synchronization shaft 5 is connected to the second output shaft 325, and the other end of the synchronization shaft 5 is connected to the first power input shaft 2271. A second power output shaft 2241 and a third power output shaft 2242 are provided at two opposite ends of the shaft where the first driven worm 223 is located. The second power output shaft 2241 and the third power output shaft 2242 pass through and protrude beyond the second housing 21. The second power output shaft 2241 protrudes toward the first driven tracking bracket system 200. The third power output shaft 2242 protrudes toward the second driven tracking bracket system 300. The synchronization shaft 5 drives the first power input shaft 2271 to rotate, thereby drives the fourth driven gear 227 to rotate, and transmits the power to the third driven gear 226, the second driven gear 225, the first driven gear 224, the first driven worm 223 and the first driven worm gear 222 in sequence. As a result, the fourth driven gear 227, the third driven gear 226, the second driven gear 225, the first driven gear 224, the first driven worm 223 and the first driven worm 222 can rotate synchronously. That is, the first power output shaft 2221, the second power output shaft 2241, and the third power output shaft 2242 can simultaneously transmit power outward.

Referring to FIG. 1 to FIG. 2, the first driven tracking bracket system 200 includes a second main shaft 210, a second driven drive mechanism 220 and a third driven drive mechanism 230. The second main shaft 210 is arranged parallel to the first main shaft 1. The second driven drive mechanism 220 and the third driven drive mechanism 230 are disposed at intervals along a length direction of the second main shaft 210. The structure of the second driven drive mechanism 220 and the third driven drive mechanism 230 is the same as that of the driving drive mechanism 32.

In this embodiment, when one first driven tracking bracket system 200 is provided, the driving drive mechanism 32 is connected to the second driven drive mechanism 220 through a first linkage rod 6; and the first driven drive mechanism 2 is connected to the third driven drive mechanism 230 through another first linkage rod 6. In other embodiments, when at least two first driven tracking bracket systems 200 are provided, the at least two first driven tracking bracket systems 200 are disposed at intervals. Two second driven drive mechanisms 220 of adjacent first driven tracking bracket systems 200 are connected through first linkage rods 6; and two third driven drive mechanisms 230 of the adjacent first driven tracking bracket systems 200 are connected through another first linkage rods 6.

Figure 8:
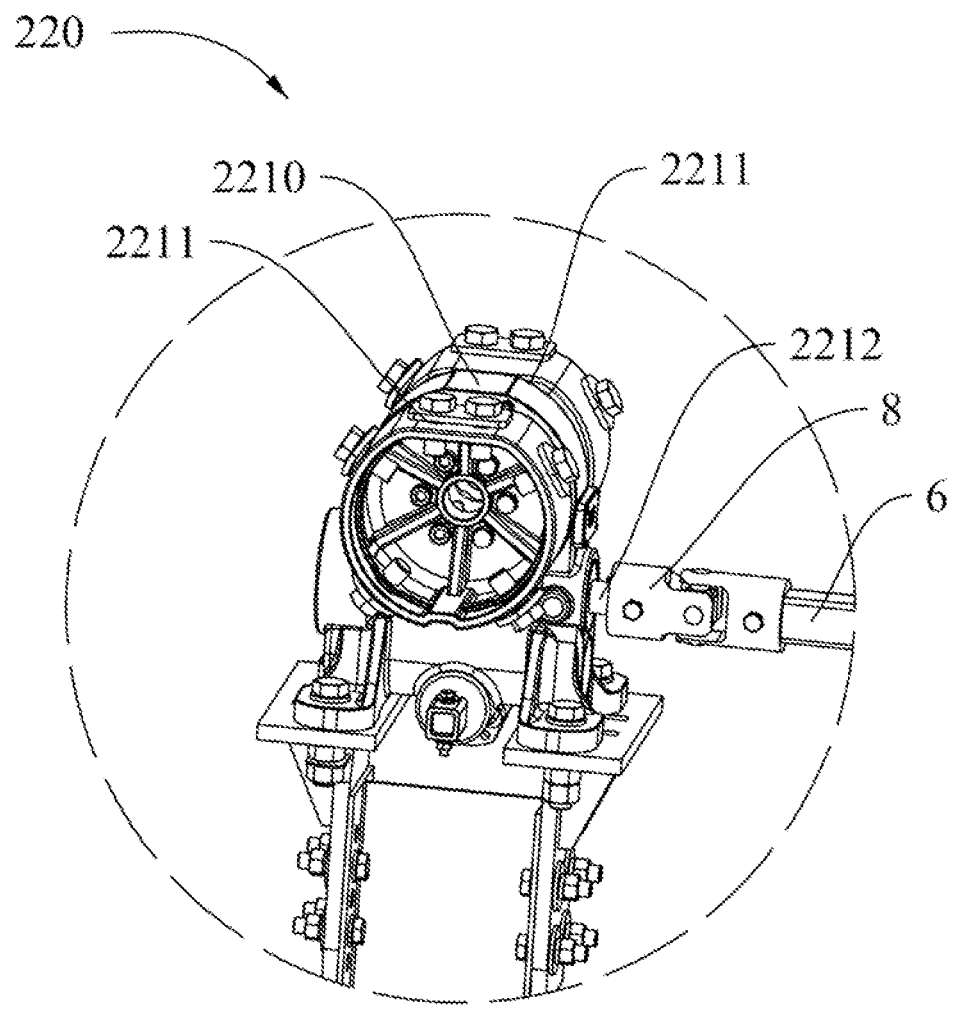
FIG. 8 is a partially enlarged schematic view of a second driven drive mechanism and the first linkage rod of the present disclosure.

Referring to FIG. 8, the second driven drive mechanism 220 includes a third housing 2210 and a second transmission assembly inside the third housing 2210. The second transmission assembly includes a second driven worm gear and a second driven worm meshing with a lower side of the second driven worm gear. Two fourth power output shafts 2211 are provided at the ends of the second driven worm gear. The two fourth power output shafts 2211 are respectively connected to the second main shaft 210 for driving the second main shaft 210 to rotate. The shaft where the second driven worm is located is the second power input shaft 2212. The second power input shaft 2212 passes through and protrudes beyond the third housing 2210. The third output shaft 326 is connected to the second power input shaft 2212 through the first linkage rod 6. Both ends of the first linkage rod 6 are provided with universal joints 8. The two universal joints 8 are respectively connected with the third output shaft 326 and the second power input shaft 2212 for fine-tuning in the horizontal and vertical directions to adapt to the sloped terrain and ensure the stability of the transmission.

Figure 9:
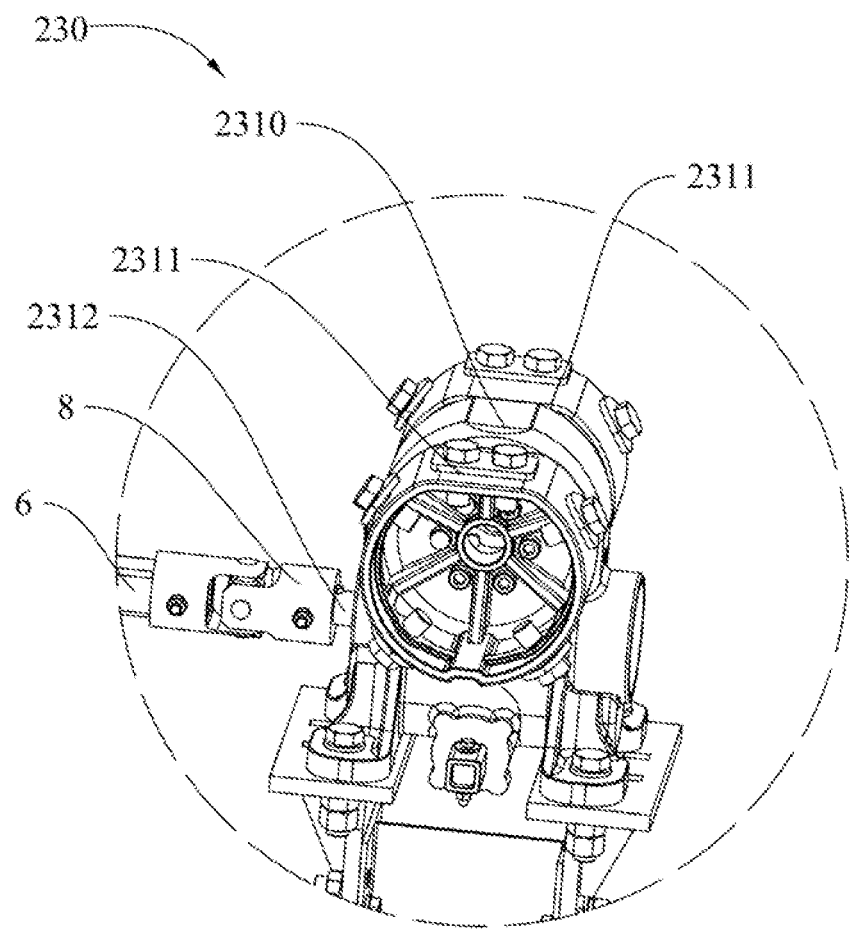
FIG. 9 is a partially enlarged schematic view of a third driven drive mechanism and the first linkage rod of the present disclosure.

Referring to FIG. 9, the third driven drive mechanism 230 includes a fourth housing 2310 and a third transmission assembly inside the fourth housing 2310. The third transmission assembly includes a third driven worm gear and a third driven worm meshing with a lower side of the third driven worm gear. Two fifth power output shafts 2311 are provided at the ends of the third driven worm gear. The two fifth power output shafts 2311 are respectively connected to the second main shaft 210 for driving the second main shaft 210 to rotate. The shaft where the third driven worm is located is the third power input shaft 2312. The third power input shaft 2312 passes through and protrudes beyond the fourth housing 2310. The second power output shaft 2241 is connected to the third power input shaft 2312 through the first linkage rod 6. Both ends of the first linkage rod 6 are provided with universal joints 8. The two universal joints 8 are respectively connected with the second power output shaft 2241 and the third power input shaft 2312 for fine-tuning in the horizontal and vertical directions to adapt to the sloped terrain and ensure the stability of the transmission.

Referring to FIG. 1 to FIG. 2, the second driven tracking bracket system 300 includes a third main shaft 310, a fourth driven drive mechanism 320 and a fifth driven drive mechanism 330. The third main shaft 310 is arranged parallel to the first main shaft 1. The fourth driven drive mechanism 320 and the fifth driven drive mechanism 330 are disposed at intervals along a length direction of the third main shaft 310. The structure of the fourth driven drive mechanism 320 and the fifth driven drive mechanism 330 is the same as that of the driving drive mechanism 32. In this embodiment, when one second driven tracking bracket system 300 is provided, the driving drive mechanism 32 is connected to the fourth driven drive mechanism 320 through a second linkage rod 7;

and the first driven drive mechanism 2 is connected to the fifth driven drive mechanism 330 through another second linkage rod 7. In other embodiments, when at least two second driven tracking bracket systems 300 are provided, the at least two second driven tracking bracket systems 300 are disposed at intervals. The two fourth driven drive mechanisms 320 of adjacent second driven tracking bracket systems 300 are connected through second linkage rods 7. The two fifth driven drive mechanisms 330 of the adjacent fourth driven tracking bracket systems 320 are connected through another second linkage rods 7.

Figure 10:
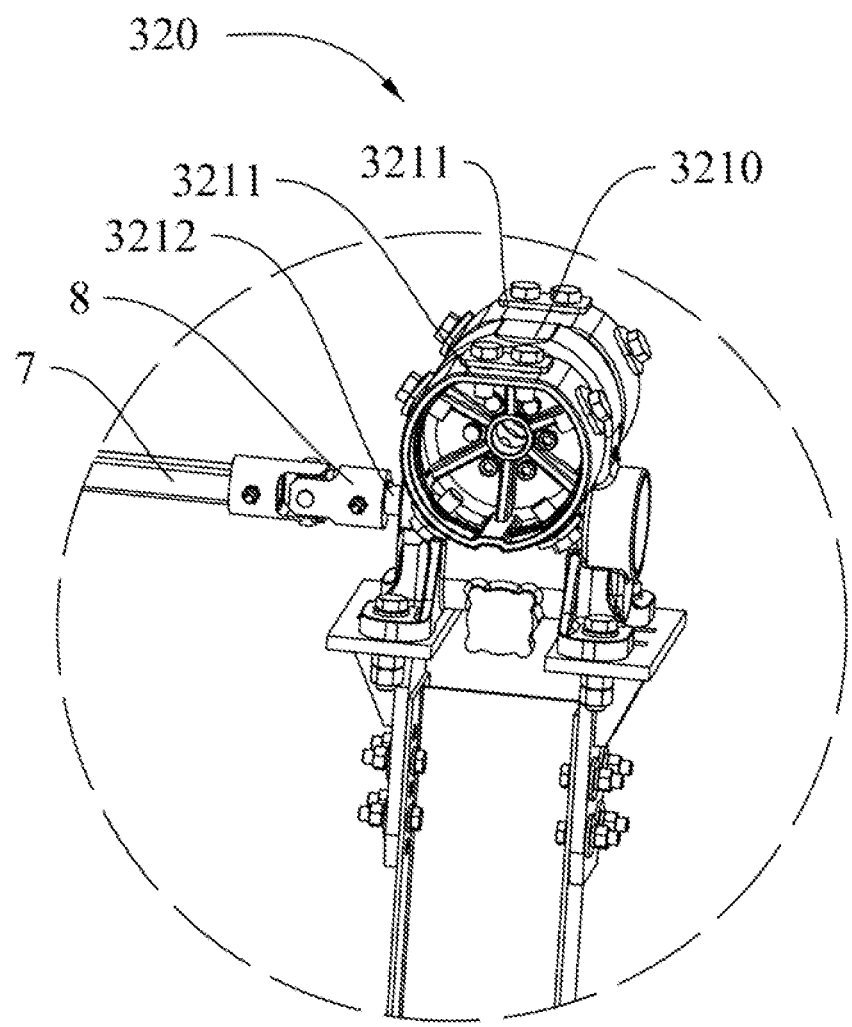
FIG. 10 is a partially enlarged schematic view of a fourth driven drive mechanism and the second linkage rod of the present disclosure.

Referring to FIG. 10, the fourth driven drive mechanism 320 includes a fifth housing 3210 and a fourth transmission assembly inside the fifth housing 3210. The fourth transmission assembly includes a fourth driven worm gear and a fourth driven worm meshing with a lower side of the fourth driven worm gear. Two sixth power output shafts 3211 are provided at the ends of the fourth driven worm gear. The two sixth power output shafts 3211 are respectively connected to the third main shaft 310 for driving the third main shaft 310 to rotate. The shaft where the fourth driven worm is located is the fourth power input shaft 3212. The fourth power input shaft 3212 passes through and protrudes beyond the fifth housing 3210. The fourth power input shaft 3212 is connected to the fourth output shaft 327 through the second linkage rod 7. Both ends of the second linkage rod 7 are provided with universal joints 8. The two universal joints 8 are respectively connected with the fourth power input shaft 3212 and the fourth output shaft 327 for fine-tuning in the horizontal and vertical directions to adapt to the sloped terrain and ensure the stability of the transmission.

Figure 11:
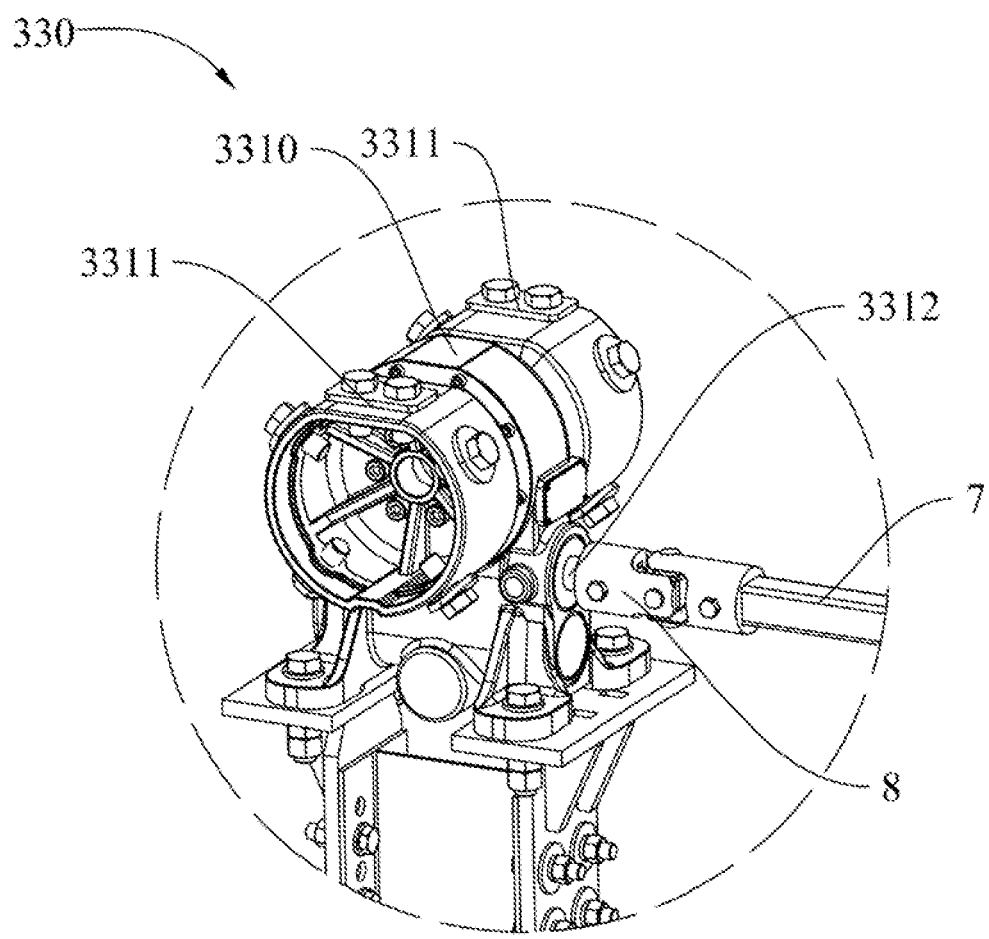
FIG. 11 is a partially enlarged schematic view of a fifth driven drive mechanism and the second linkage rod of the present disclosure.
Figure 12:
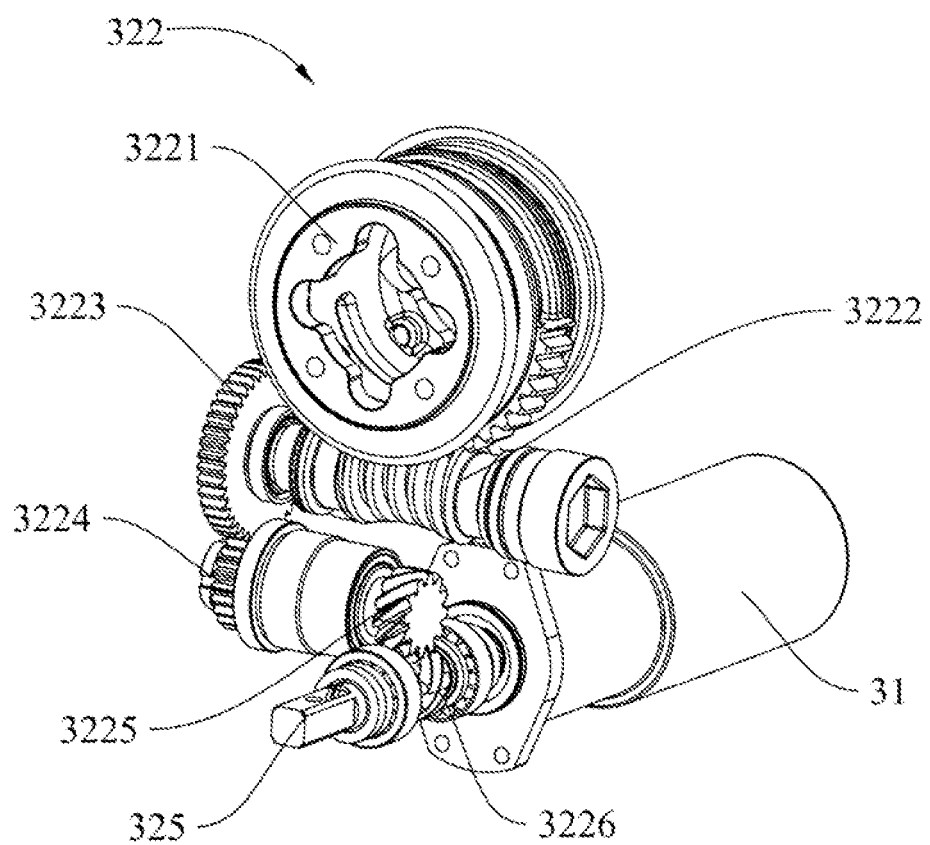
FIG. 12 is a perspective schematic view of a driving transmission assembly of the present disclosure.
Figure 13:
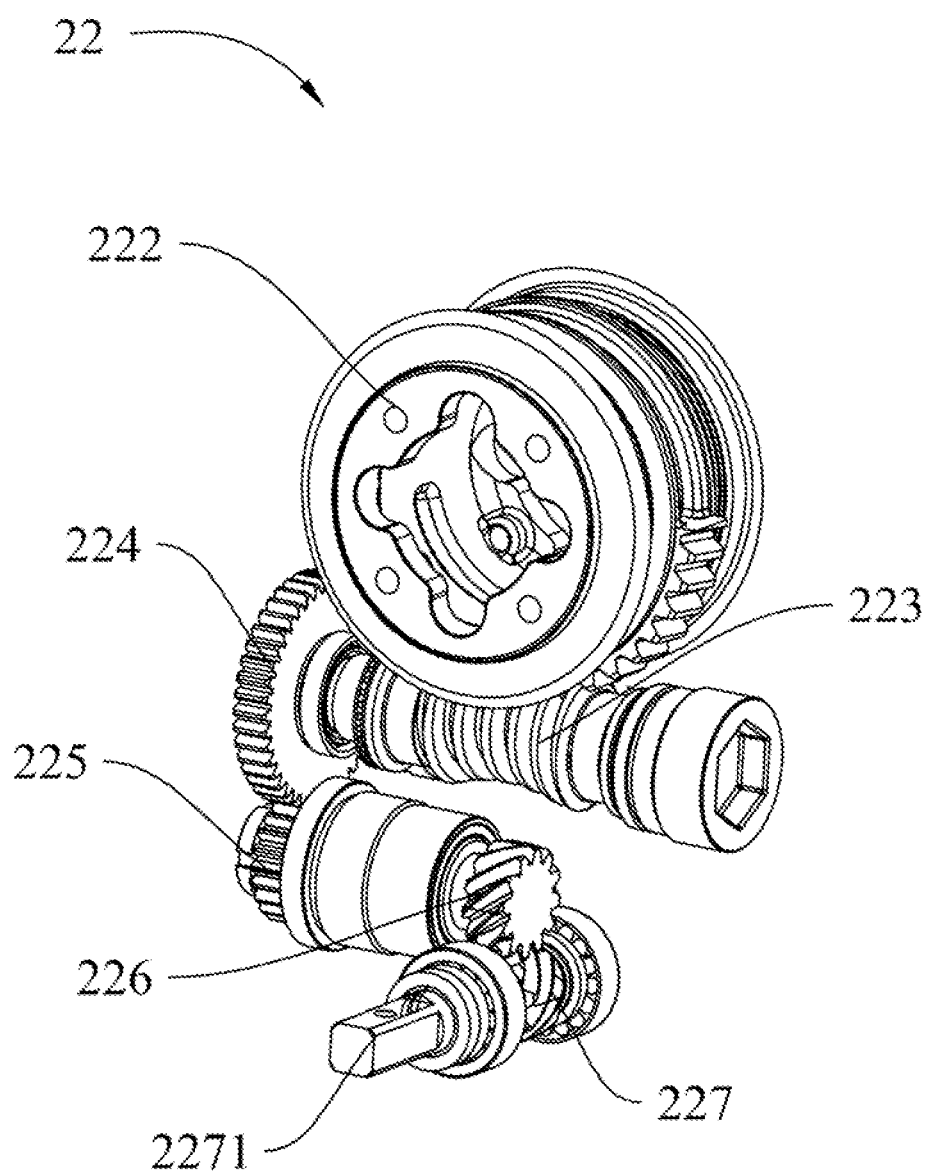
FIG. 13 is a schematic perspective view of a first transmission assembly of the present disclosure.

Referring to FIG. 11, the fifth driven drive mechanism 330 includes a sixth housing 3310 and a fifth transmission assembly inside the sixth housing 3310. The fifth transmission assembly includes a fifth driven worm gear and a fifth driven worm meshing with a lower side of the fifth driven worm gear. Two seventh power output shafts 3311 are provided at the ends of the fifth driven worm gear. The two seventh power output shafts 3311 are respectively connected with the third main shaft 310 for driving the third main shaft 310 to rotate. The shaft where the fifth driven worm is located is the fifth power input shaft 3312. The fifth power input shaft 3312 passes through and protrudes beyond the sixth housing 3310. The third power output shaft 2242 is connected to the fifth power input shaft 3312 through the second linkage rod 7. Both ends of the second linkage rod 7 are provided with universal joints 8. The two universal joints 8 are respectively connected with the third power output shaft 2242 and the fifth power input shaft 3312 for fine-tuning in the horizontal and vertical directions to adapt to the sloped terrain and ensure the stability of the transmission.

A sum of lengths of the two first linkage rods 6 is less than a length of the synchronization shaft 5. Compared with setting the same synchronization shaft 5 in the first driven tracking bracket system 200 as in the driving tracking bracket system 100, the length can be shortened. By providing several tracking brackets in a photovoltaic power station, the structural cost can be reduced. Therefore, the sum of the lengths of the two second linkage rods 7 is less than the length of the synchronization shaft 5, which can also achieve the purpose of reducing the structural cost.

In summary, the synchronous driving device 3 of the present disclosure is provided with the driving drive mechanism 32 with the first output shaft 324, the second output shaft 325, the third output shaft 326 and the fourth output shaft 327, which are respectively used to connect the main shaft 10, the synchronization shaft 5, the first driven tracking bracket system 200 and the second driven tracking bracket system 300 linked to adjacent sides. Compared with the structure using the push rod arm and the connecting rod, the material used and the cost can be reduced, and the whole structure can be made more compact.

Besides, the photovoltaic tracking bracket system 10 of the present disclosure is provided with the above-mentioned synchronous drive device 3 and the first driven drive mechanism 2 which are disposed at intervals on the first main shaft 1 of the driving tracking bracket system 100, the third output shaft 326 and the fourth output shaft 327 of the synchronous driving device 3 are respectively used for linkage connection with the adjacent first driven tracking bracket system 200 and the second driven tracking bracket system 300, so as to realize multi-point synchronous driving for the driven tracking system. As a result, the precision and stability of the main shaft rotation are improved, and the torque of the main shaft is reduced. Compared with the flat single-axis tracking bracket system, the linked photovoltaic tracking bracket system 10 of the present disclosure can also save the control box of the driven tracking bracket and reduce the cost. Two shorter linkage rod transmission structures replace the longer synchronization shaft 5, which can also save materials.

The above embodiments are only used to illustrate the present disclosure rather than limit the technical solutions described in the present disclosure. The understanding of this specification should be based on those skilled in the art. The above-mentioned embodiments have been described in detail, for example, directional descriptions such as "front", "rear", "left", "right", "top" and "bottom", although this specification has been described in detail with reference to the above-mentioned embodiments, but it is understandable that those skilled in the art can still make modifications or equivalent replacements to the present disclosure. All those technical solutions and their improvements that do not deviate from the spirit and scope of the present invention shall fall within the scope of the claims of this application.

What is claimed is:
1. A photovoltaic tracking bracket system, comprising:
a driving tracking bracket system comprising a first main shaft, a first driven drive mechanism and a synchronous driving device; the synchronous driving device comprising a driving source and a driving drive mechanism; the synchronous driving device and the first driven drive mechanism being disposed at intervals along a length direction of the first main shaft; a structure of the first driven drive mechanism being the same as that of the driving drive mechanism; the first driven drive mechanism being connected with the driving drive mechanism through a synchronization shaft;
at least one first driven tracking bracket system which is arranged on one side along a width direction of the first main shaft; the at least one first driven tracking bracket system comprising a second main shaft, a second driven drive mechanism and a third driven drive mechanism; the second main shaft being arranged parallel to the first main shaft; the second driven drive mechanism and the third driven drive mechanism being disposed at intervals along a length direction of the second main shaft; the second driven drive mechanism and the third driven drive mechanism having the same structure as the driving drive mechanism; the driving drive mechanism being connected with the second driven drive mechanism through a first linkage rod; the first driven drive mechanism being connected with the third driven drive mechanism through another first linkage rod;

at least one second driven tracking bracket system which is arranged on another side along the width direction of the first main shaft; the at least one second driven tracking bracket system comprising a third main shaft, a fourth driven drive mechanism and a fifth driven drive mechanism; the third main shaft being arranged parallel to the first main shaft; the fourth driven drive mechanism and the fifth driven drive mechanism being disposed at intervals along a length direction of the third main shaft; the fourth driven drive mechanism and the fifth driven drive mechanism having the same structure as the driving drive mechanism; the driving drive mechanism being connected with the fourth driven drive mechanism through a second linkage rod; and the first driven drive mechanism being connected with the fifth driven drive mechanism through another second linkage rod;

wherein the driving drive mechanism comprises a first housing and a driving transmission assembly which is arranged in the first housing and engaged in transmission; the driving transmission assembly comprises an input shaft, a first output shaft, a second output shaft, a third output shaft and a fourth output shaft; a driving end of the driving source is connected with the input shaft; the first output shaft, the second output shaft, the third output shaft and the fourth output shaft protrude beyond the first housing, respectively; the first output shaft and the second output shaft are disposed in parallel along a vertical direction; the third output shaft and the fourth output shaft protrude oppositely beyond the first housing; both the third output shaft and the fourth output shaft are perpendicular to the first output shaft and the second output shaft; the first output shaft, the second output shaft, the third output shaft and the fourth output shaft are configured to be driven by the driving source to rotate synchronously.

2. The photovoltaic tracking bracket system according to claim 1, wherein when at least two first driven tracking bracket systems are provided, the at least two first driven tracking bracket systems are disposed at intervals; two second driven drive mechanisms of adjacent first driven tracking bracket systems are connected through the first linkage rod; two third driven drive mechanisms of the adjacent first driven tracking bracket systems are connected through the another first linkage rod; and/or, when at least two second driven tracking bracket systems are provided, the at least two second driven tracking bracket systems are disposed at intervals; two fourth driven drive mechanisms of adjacent second driven tracking bracket systems are connected through the second linkage rod; two fifth driven drive mechanisms of the adjacent fourth driven tracking bracket systems are connected through the another second linkage rod.

3. The photovoltaic tracking bracket system according to claim 1, wherein each of two ends of both of the first linkage rod and the another first linkage rod is provided with a universal joint; and wherein each of two ends of both of the second linkage rod and the another second linkage rod is provided with a universal joint.

4. The photovoltaic tracking bracket system according to claim 1, wherein a sum of lengths of the first linkage rod and the another first linkage rod is smaller than a length of the synchronization shaft; a sum of lengths of the second linkage rod and the another second linkage rod is less than the length of the synchronization shaft.

* * * * *